Aug. 19, 1952   W. W. VLASAK ET AL   2,607,248
STEPPED JAWS CLOSURE REMOVER WITH PIVOTED HANDLES
Filed June 5, 1950

William W. Vlasak
Thomas G. Vlasak
INVENTORS

BY Clarence A. O'Brien
and Harvey B. Jacobson
Attorneys

Patented Aug. 19, 1952

2,607,248

UNITED STATES PATENT OFFICE 2,607,248

STEPPED JAWS CLOSURE REMOVER WITH PIVOTED HANDLES

William W. Vlasak and Thomas G. Vlasak, St. Louis, Mo.

Application June 5, 1950, Serial No. 166,242

1 Claim. (Cl. 81—3.44)

This invention relates to improvements in devices for removing container caps or closures.

An object of this invention is to provide an improved tool of the plier type which is adapted to remove closures from containers, notwithstanding the contents of the containers, this tool consisting of a pair of arms which are arranged to form handles at one pair of ends thereof, while the other pair of ends are especially designed for gripping the closure of the receptacle or container.

It is an important feature of the invention to eliminate a long handle by placing the pivot pin very close to the side of the container closure or lid to be removed whereby it is unnecessary to have a long handle, yet the leverage will be great. Accordingly by using a small handle the device may be stored in a small space. The handles open and close a very short amount, whereby the device is much easier to manipulate.

Another object of this invention is to provide an improved arrangement of arms whereby they are pivoted together very close to the jaws and jaw forming ends of the arms so that a rather large lever arm is provided when the handles are operated.

A further object of this invention is to provide an assembly of chucks which form jaws, said assembly being so constituted as to provide a large amount of vision space for the operator of the device.

Ancillary objects and features of importance will become apparent in following the description of the illustrated forms of the invention.

Figure 1:
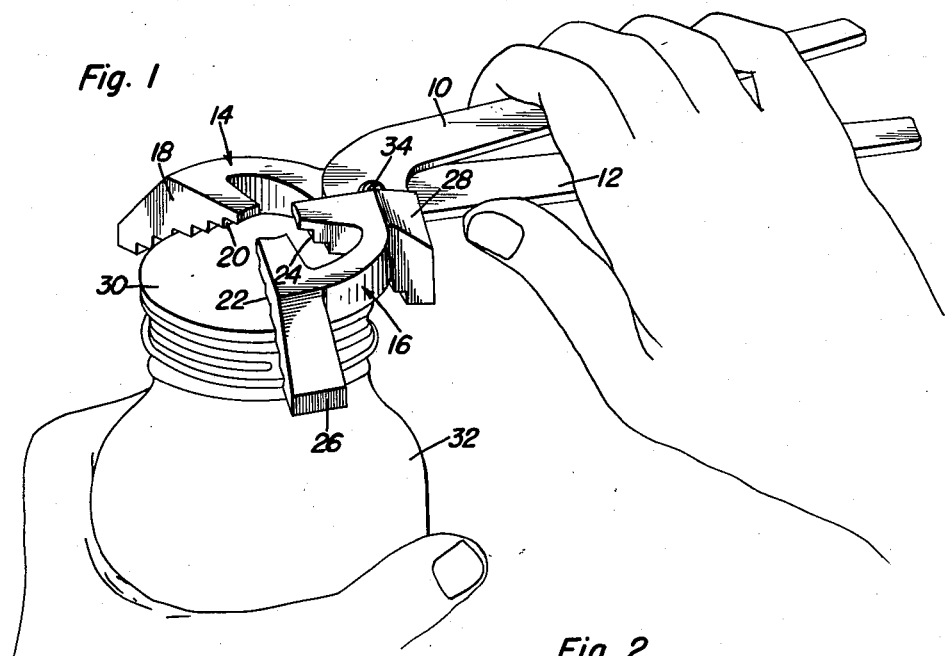
Figure 1 is a perspective view of the device showing it in use on a typical receptacle and closure.

Referring now to the drawing in detail to Figures 1 to 4, inclusive, thereof in particular, it will be seen that the tool comprises a pair of metallic handles 10 and 12 having one end portion crossed and pivotally connected at 34. Formed integrally with the pivotally connected ends of the handles 10 and 12 is a pair of outwardly and forwardly curved, relatively long and short arms 16 and 14, respectively.

Formed integrally with the free end portion of the short arm 14 is a single jaw 18 comprising a stepped face 20. Formed integrally with the long arm 16 at spaced points is a pair of jaws 26 and 28 comprising, respectively, stepped faces 22 and 24.

Figure 2:
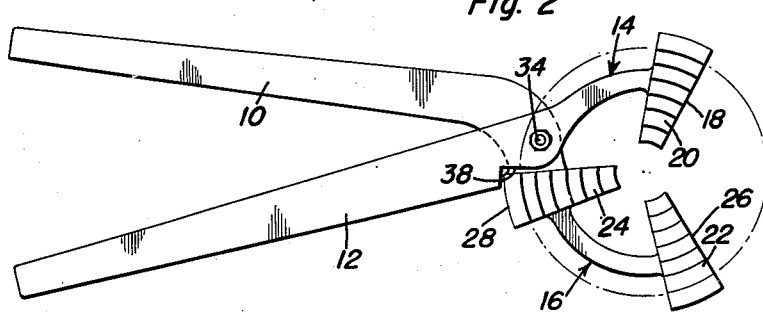
Figure 2 is a bottom view of the device showing a container therein in phantom.
Figure 3:
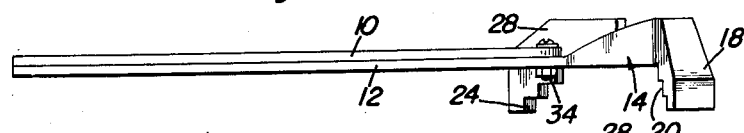
Figure 3 is an elevational view of the device.
Figure 4:
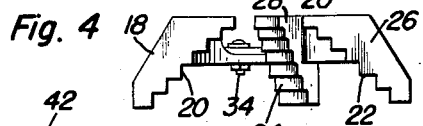
Figure 4 is an end view of the device.

As shown to advantage in Figure 2 of the drawing, the jaws 18, 26 and 28 radially disposed for receiving therebetween and frictionally gripping the usual screw top 30 of a container 32 (see Fig. 1). As will be readily apparent, the stepped faces 20, 22 and 24 of the jaws 18, 26 and 28, respectively, accommodate various sizes of container closures. The jaw 28 is engageable in a recess 38 in the pivoted end portion of the handle 12 for positively limiting the opening movement of the tool.

Figure 5:
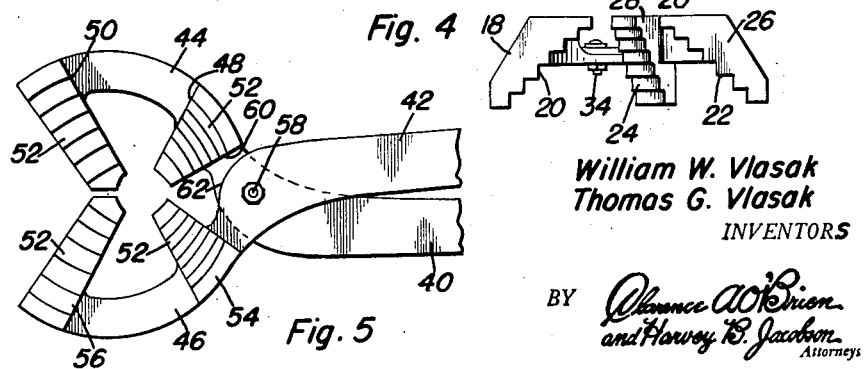
Figure 5 is a fragmentary bottom view of a modified form of the invention.

The modified form of the invention shown in Figure 5 of the drawing comprises a pair of metallic handles 40 and 42 having one end portion crossed and pivotally connected at 58. Formed integrally with the pivoted ends of the handles 40 and 42 is a pair of outwardly and forwardly curved arms 44 and 46, respectively, of equal length. Jaws 48 and 50 are formed integrally with the arm 44 at spaced points. Similar jaws 54 and 56 are formed integrally with arm 46. All of the jaws 48, 50, 54 and 56 comprise stepped faces 52 for accommodating various sizes of container closures. Opening movement of the tool is positively limited by the engagement of the side 60 of the jaw 48 with the adjacent end portion 62 of the handle 42.

It is believed that the many advantages of a container opener constructed in accordance with the present invention will be readily understood and although preferred embodiments of the device are as illustrated and described, it is to be understood that further modifications and changes in the details of construction may be resorted to which will fall within the scope of the invention as claimed.

Having described the invention, what is claimed as new is:

A tool for removing receptacle closures comprising, a pair of handles crossed and pivotally connected at one end, a pair of relatively long and short, outwardly and forwardly curved arms integral with the pivotally connected ends of said handles, a pair of spaced, radial jaws integral with the long arm, a single radial jaw integral with the free end of the short arm and cooperable with the first named jaws for gripping a closure therebetween, said jaws including arcuate stepped faces of substantial width accommodating different sizes of closures, and a stop on the pivoted end portion of one of the handles engageable with one of the first named jaws for limiting the swinging movement of the handles away from each other.

WILLIAM W. VLASAK.
THOMAS G. VLASAK.

REFERENCES CITED

The following references are of record in the file of this patent:

UNITED STATES PATENTS

| Number | Name | Date |
|---|---|---|
| 455,721 | Milburn | July 7, 1891 |
| 2,441,743 | Albert | May 18, 1948 |